United States Patent [19]

DeAngelis

[11] Patent Number: 4,605,634

[45] Date of Patent: * Aug. 12, 1986

[54] REACTION SINTERED OXIDE-BORIDE

[75] Inventor: Thomas P. DeAngelis, Horseheads, N.Y.

[73] Assignee: Corning Glass Works, Corning, N.Y.

[*] Notice: The portion of the term of this patent subsequent to Sep. 10, 2002 has been disclaimed.

[21] Appl. No.: 749,559

[22] Filed: Jun. 27, 1985

Related U.S. Application Data

[63] Continuation-in-part of Ser. No. 454,671, Dec. 30, 1982, abandoned.

[51] Int. Cl.[4] .................................... C04B 35/58
[52] U.S. Cl. ........................................ 501/96; 501/98; 51/309
[58] Field of Search ............... 501/98, 96; 51/309

[56] References Cited

U.S. PATENT DOCUMENTS

| | | | |
|---|---|---|---|
| 2,886,537 | 5/1959 | Jackson | 501/132 |
| 3,143,413 | 8/1964 | Krapf | 501/96 |
| 3,353,954 | 11/1967 | Williams | 75/201 |
| 4,181,584 | 1/1980 | Steiger et al. | 204/67 |
| 4,379,852 | 4/1983 | Watanabe et al. | 501/87 |
| 4,540,475 | 9/1985 | DeAngelis | 501/98 |

FOREIGN PATENT DOCUMENTS

| | | | |
|---|---|---|---|
| 51-22002 | 7/1976 | Japan | 501/98 |
| 56-120570 | 9/1981 | Japan | 501/98 |

*Primary Examiner*—Mark L. Bell
*Attorney, Agent, or Firm*—R. N. Wardell

[57] ABSTRACT

Ceramic body formed by reaction sintering at pressures ranging from subatmospheric to superatmospheric of admixed and shaped reactants, which can be elements, compounds, intermetallic compounds and/or alloys, in stoichiometric proportions to substantially form 10–90 mole percent of boride phase or phases of one or more of elements of Groups 3b including lanthanide and actinide series elements, 4b, 5b and 6b, and 10–90 mole percent of oxide phase or phases of one or more of elements of Groups 3a, 4a, 3b, 4b, 5b, 6b and 8, and which phases have a maximum grain size substantially not greater than 15 μm. Body in a form for wear resistance and corrosion-erosion resistance has a virtual absence of open porosity, e.g. not greater than 5% or less than about 3%, and a Rockwell A hardness of greater than 90.

24 Claims, No Drawings

REACTION SINTERED OXIDE-BORIDE

CROSS-REFERENCE TO RELATED APPLICATION

This is a continuation-in-part of application Ser. No. 454,671 filed Dec. 30, 1982 now abandoned.

BACKGROUND OF THE INVENTION

The field of the invention is oxide-boride ceramic bodies which can have one or more of oxide phases and one or more of boride phases.

Most commonly heretofore, these oxide-boride ceramic bodies have been of the type physically formed of ingredients corresponding to the crystalline phases in the ceramic bodies. By way of exemplary illustration, reference is made to the following prior art documents. U.S. Pat. No. 2,270,607 discloses mixing, shaping and sintering at least 10 wt. % of oxides of Al, Zr, Be and/or Th with borides of W, Fe and the like to yield ceramic bodies of those same phases. U.S. Pat. No. 3,067,146 discloses hot pressing or shaping and sintering of mixtures of $TiB_2$, $Al_2O_3$ and $Cr_2O_3$ to form ceramic bodies of substantially those same phases. U.S. Pat. No. 3,296,002 discloses firing porous shaped mixtures of aluminum and alloys thereof with borides of Cr, Mo, Ti, W and Zr in oxidizing atmosphere to form porous alumina-boride ceramics. U.S. Pat. No. 4,022,584 discloses hot pressed or shaped and sintered mixtures of $Al_2O_3$, MgO and borides of metal from Groups 4b, 5b and 6b to provide ceramic bodies of substantially those same phases. U.S. Pat. No. 4,110,260 sintering shaped mixtures of a wide variety of ingredients including insulating ceramics such as alumina and zirconia and electroconductive substances such as borides of Ti and Zr. U.S. Pat. No. 4,343,909 discloses sintering pressed mixtures of $Al_2O_3$, $ZrO_2$, $TiB_2$ and grain growth inhibitor to yield a product of substantially those same phases.

Generally those hot pressed or sintered physical mixtures require heating to relatively high temperatures of 1600°–2000° C. or so. Moreover, such ceramic bodies have properties which are dependent upon and limited by the inherent effects of the physical nature of their ingredients which are physically combined. The distribution and sizing of the phases are generally directly related to the particle sizing and mixing of ingredient powders. The powders are not always easily available in uniformly fine sizes for obtaining homogeneous distribution of phases and superior properties. Milling of powders to improve their sizing can lead to undesirable situations. In fact, some powders such as $TiB_2$ in sizes of about 5 μm or finer present fire and explosion hazard during milling due to their rapid reaction with oxygen in air under conditions of frictional heating.

Amongst numerous reactions for forming other types of multiphase bodies by an unusual reaction hot pressing process involving passage of electric current through the reaction mixture during the process, U.S. Pat. No. 3,143,413 discloses reaction hot pressed ceramics with phases of MgO and either $TiB_2$ or $ZrB_2$, but no details are given about the properties of such body made from −60 mesh reactant powders heated up to 1800°–2300° C.

There has been a continuing need for oxide-boride ceramics with easily controlled and predictable composition, crystal structure (including uniform phase distribution and fine grain size) and related physical properties, and which can be easily and economically fabricated in a variety of shapes by heating at lower temperatures.

SUMMARY OF THE INVENTION

It is an object of this invention to provide a product or body which substantially overcomes the aforesaid limitations of the prior art and enables the practical attainment of greater technical and economic ease and flexibility in providing ceramic bodies of oxide and boride phases with specially tailored and improved properties as noted herein.

It is also an object of this invention to provide certain advantageous product features as detailed hereinafter.

The invention is characterized by the discovery of a novel reaction sintered ceramic body and the method of forming it, which body is characterized by uniformly fine-grained and intimately interdispersed phases of oxide and boride easily obtained from reactants generally having substantially larger particle sizing than the grain size of the phase in the ceramic body, viz. usually one order of magnitude larger. The reaction hot pressed body of this invention is noted for virtual absence of open porosity, toughness and hardness for wear resistance, corrosion/erosion resistance to molten aluminum (with predominantly $Al_2O_3$ phase or phases), low electrical resistivity, good thermal shock and oxidation resistance. It is also notable that these valuable properties can be attained by heating the mixture of reactants to temperature less than 1600° C. and without need for any grain growth inhibitor or sintering aid.

The invention is a reaction sintered oxide-boride ceramic body consisting essentially of a fine-grained, homogeneous, intimate interdispersion of:

(a) 10–90 (preferably 25–90) mole percent of boride phase or phases having a maximum grain size substantially (e.g. at least 95 volume percent) not greater than 15 μm and being boride of one or more of the elements of Groups 3b including lanthanide and actinide series elements, 4b, 5b and 6b, and (b) 10–90 (preferably 10–75) mole percent of oxide phase or phases having a maximum grain size substantially (e.g. at least 95 volume percent) not greater than 15 μm and being oxide of one or more of the elements of Groups 3a, 4a, 3b, 4b, 5b, 6b and 8;

which body is prepared by the process comprising;

(c) admixing particulate reactants of maximum particle size substantially (e.g. at least 95 volume percent) not greater than 150 μm and being elements, compounds, intermetallic compounds, alloys or combination thereof in stoichiometric proportions to substantially form the boride and oxide phases, and (d) shaping and heating the admixture to form the reaction sintered body, the heating being done in nonreactive atmosphere and at temperature at which the reaction and sintering occurs between the reactants to substantially form the boride and oxide phases.

In its most uniquely characterized form for wear resistance and corrosion/erosion resistance, this reaction sintered oxide-boride ceramic body has a virtual absence of open porosity, such as not greater than 5% by volume being open porosity, or beneficially less than about 3% being open porosity as illustrated by Bodies A, B and D hereinafter described. It also advantageously has a Rockwell A hardness of greater than 90.

Reaction sintering involves the dual effects of reaction between and sintering together of the admixed reactants at temperature causing the reaction to occur and be substantially completed. It may be effected at atmospheric, subatmospheric or superatmospheric pressure. The latter condition involves the substantially simultaneous shaping and heating steps of hot pressing to produce a body of the invention with very little or no open porosity and highest strength properties, although some preliminary separate pressing or heating of the reactant admixture may be advantageously done. Where open porosity is desired in an otherwise tough and hard body of the invention, the separate heating step at atmospheric or subatmospheric pressure may be employed sequentially following the shaping step.

Of course, reaction temperature is governed by the particular reactants and their identified reaction temperature at whatever pressure is selected for performing the heating step.

The body of the invention may contain, as part of the boride and/or oxide phases, diluent which is a nonreacted portion of the reactant admixture as a stoichiometric excess amount of a reactant and/or as a boride or oxide according to the aforesaid invention definition but different than the reactants.

Generally the element forming the boride cation is different than the element forming the oxide cation.

DETAILED DESCRIPTION

It is believed that reaction sintering relies on the reaction having a substantial negative heat of formation as the driving force for the reaction. The products or bodies formed must have lower free energy of formation than the reactants from which they were prepared. The elements of the groups of the Periodic Table as recited in the description of the invention are selected for the invention body so as to conform to these principles.

Reaction sintering is initiated by heating the shaped mixture. At the reaction initiation temperature, the reactants begin to react and liberate a substantial amount of heat. This exotherm causes a sharp temperature rise in the reactant powder mixture. it is believed that this rapid temperature rise permits rapid diffusion of the reactants within the mixture, which causes either hot pressing compaction or sintering shrinkage under atmospheric or subatmospheric pressure as well as further chemical reaction to occur quickly. The reaction initiating temperature is generally much lower than the temperature necessary to attain a dense body the conventional hot pressing or separate pressing and sintering of preformed phase ingredients where no reaction occurs.

Several processing parameters may be adjusted to optimize the conduction of the reaction sintering and the properties of the resultant ceramic body. Some of these parameters are: type, purity and surface area of the particulate reactants; stoichiometry of the reactant mixture; pretreatment of the reactants, rate of heating; magnitude of applied pressure before and/or during heating; post heating treatments; and geometry of the body or product.

Reaction sintering of admixtures according to this invention produces articles or bodies with the boride and oxide phases having very small grain size, generally about one order of magnitude smaller than the particle size of the starting reactant powders. The reaction sintered ceramic bodies can be easily prepared with maximum grain sizes of the boride and oxide phases being substantially (e.g. at least 95 volume percent) not greater than 5 $\mu$m (preferably less than 2 $\mu$m) or even with mean grain sizes of such phases being substantially (e.g. at least 95 volume percent) not greater than 3.5 $\mu$m. These very fine grain sizes can be attained by using reactants with maximum particle sizes substantially (e.g. at least 95 volume percent) not greater than 44 $\mu$m or with mean particle sizes less than about 20 $\mu$m. Grain growth is usually not experienced because the products or bodies can be made at significantly lower temperatures with shorter hold times at heating temperature than by conventional nonreactive manufacturing techniques. Achieving such small grain sizes is often difficult if not impractical to accomplish using conventional nonreactive techniques because either preformed phase powders are not readily available in such small particle size of less than 5 $\mu$m for the reasons noted above or irregular grain growth occurs at the higher processing temperatures in the absence of effective grain growth inhibitor.

Generally the particulate reactant are mixed in the stoichiometric proportions to form the desired product phases. For example, the following molar proportion formula describes exemplary reaction mixture and product phases:

$$6TiO_2 + AlB_{12} + 7Al \rightarrow 6TiB_2 + 4Al_2O_3$$

However, nonstoichiometric proportions (e.g. of $TiO_2$) may be used in order to vary the properties of the product or to control the reaction process. Powdered diluent material may also be added to the reactant mixture. The diluent may be or contain one of the elements of the reactants or may be the same as one of the reaction-produced phases in the products or may be other suitable material, any of which may be used to control the reaction sintering or properties of the resultant product. The amount of diluent or diluents must be less than that amount which would prevent the reaction sintering from taking place.

The reactants can be mixed or blended in any suitable manner known to those skilled in ceramic technology for yielding an intimate, homogeneous mixture of reactant particles, e.g. by ball milling in dry or wet condition.

For very dense products, the hot pressing procedure, including hot isostatic pressing, is employed. The mixed reactants are charged into a mold. If desired, those reactants may be given pretreatments such as dehydration, degassing or burn-out of binder, provided the pretreatment temperature is kept below the reaction initiation temperature. It is advantageous to precompact the reactant mixture at room temperature and at 50–100% hot pressing pressure to ensure a uniformly compacted product after hot pressing. This was routinely done in making samples of the invention. For common hot pressing with a mold comprising an annular die with upper and lower plungers, the mold for precompaction (and even pretreatment) is preferably the same one used in subsequent hot pressing. The mold can be of any material not adversely reactive with the reaction mixture and that can withstand desired pressures up to 15,000 psi (about 1055 kg/cm$^2$) or more. Graphite molds have been found very suitable for pressures up to 10,000 psi (about 700 kg/cm$^2$) and were exclusively used in making the samples of the invention. At least the precompaction pressure is usually applied to the charged mold and a suitable atmosphere is provided to completely contact the charged mold before heating is begun to effect exchange reaction hot pressing. A moderate vacuum (e.g. about $1 \times 10^{-4}$ Torr) was satisfactorily employed in making the samples of the invention; however, inert gas atmosphere may also be employed for the same purpose of protecting the reactants and the mold from adverse air oxidation. As necessary, the pressure is increased to the full load during heating to or at the maximum hot pressing temperature. To assure good body density, full pressure should be at least 2000 psi (about 140 kg/cm$^2$). Heating can be done in any suitable hot pressing furnace, such as an induction heating furnace or electric resistance heating furnace used to make samples of the invention, which provides very rapid heat-up. Heating rates satisfactorily employed ranged between 9° and 25° C./minute, the slower rates being used with reactant mixtures evolving hydrogen that is drawn off by the vacuum system. Heating progresses to a temperature at which the reaction sintering is initiated. That event is marked by a rapid temperature rise in the mold due to exothermic heat evolution from the reaction. When the maximum temperature and pressure for the reaction hot pressing are attained, they are usually held for at least some short period to assure complete reaction sintering, e.g. about 1–2 hours for products ranging between 1.5–2 inches (about 3.8–5.1 cm) in diameter and about 0.2–0.5 inch (about 0.5–1.3 cm) thick as in the cases of the samples made of the invention. Thereafter, the molds containing the samples are cooled in the furnace under protective atmosphere at furnace cooling rate and the pressure is held on the samples until they were cooled to about room temperature. Then the molds are removed from the furnace and the samples are pressed out of the annular mold body.

For bodies of lesser density, the reactant mixture can be fully compacted or shaped at room temperature generally at pressures up to 60,000 psi (about 4.2 tons/cm$^2$) or more, but preferably between $10-50 \times 10^3$ psi (about 0.7–3.5 tons/cm$^2$), to yield a green (i.e. unfired) body, which is subsequently sintered at atmospheric pressure. Preforming of the green body can be done by a suitable ceramic fabrication process, e.g. dry or wet pressing, isostatic pressing, slip casting, extrusion, injection molding, doctor blading, etc.

The multiphase ceramic bodies of this invention can be specially designed to have selected useful properties from a variety of choices depending upon their composition and processing. Generally they are very refractory and thermal shock resistant. They are also generally electroconductive. Many have low electrical resistivity and can function as electrodes or electrical conductors in a variety of applications. With resistance to chemical attack, such electrode and conductor applications can be in industrial electrochemical processes including electrolytic metal production (eletrowinning and electrorefining) cells, batteries and fuel cells. Some bodies can have adequate electrical resistance to function as electrical resistance elements such as heating elements. Most of them are wear-resistant and hard. They can also exhibit good strength and toughness. Consequently, those bodies can also useful serve as cutting tool tips, grinding media, high temperature bearings, engine components and other structural parts. In their more porous form, they may serve, for example, as filters for molten metal, or as high surface area or catalytic devices.

The above-described reaction sintered ceramic body, preferably in hot pressed form, can be used for components of an electrolytic aluminum production (electrowinning and electrorefining) cell in contact with molten aluminum (but preferably isolated from contact by cryolite) when the oxide phase is or phases are predominantly $Al_2O_3$ and the boride phase is or phases are boride or one or more of the elements selected from Groups 4b, 5b and 6b. Especially desirable is the body of diboride of metal selected from Group 4b (particularly titanium) and oxide of aluminum and/or boron. Molten cryolite has some tendency to corrode/erode this reaction sintered ceramic body.

BODY A

Body A of the invention was formed in accordance with the previous molar formula as follows: The batch components consisted of 58.1 wt. % $TiO_2$ powder of 1.2 μm mps, 19.0 wt. % $AlB_{12}$ powder of 11 μm mps and 22.9 wt. % Al powder of −325 mesh. These reactants were dry mixed without binder in a revolving plastic jar with alumina balls. That mixture was hot pressed in a graphite mold and in a vacuum at a maximum reaction sintering temperature of 1500° C. and 6000 psi (421.8 kg/cm$^2$) for 2 hours to yield the body exhibiting the phases of $TiB_2$(M), alpha $Al_2O_3$ (m) and Al(T), and having a quantitative chemical analysis (by weight) of: 25.0% Al, 34.5% Ti, 24.6% $O_2$, 0.098% C and 0.017% $N_2$. Body A also had <2 μm boride and oxide grain sizes, a density of 4.11 g/cc, 0% open porosity, Rockwell A hardness 94 and 117.5 μΩ-cm electrical resistivity at 25° C.

Samples of Body A were formed into two cutting tips of cutting tools with the standard diamond shaped profile and tested in a customary metal cutting test. The test involved a standardize procedure of cutting a 2 inch (5.08 cm) diameter bar or workpiece of Viscount 44 high-nickel alloy steel for each test cycle with the experimental cutting tips bonded to a cutting tool base so as to have 0° rake angle and 4° clearance angle from the workpiece. Depth of cut was 0.032 inch (0.81 mm). The workpiece was rotated at 450 rpm to provide a cutting rate of 220 surface feet/minute (5.59 m/min). The lateral feed rate axially along the workpiece was 0.005 inch/revolution (0.127 mm/revolution) and the lateral length of the workpiece cut was 2 inches (5.08 cm). Cutting was done with and without spraying of customary cutting oil lubricant onto the cutting tip at the point of contact with the workpiece. The chips of metal removed from the workpiece during this test were classified as follows, with the best cutting performance being Class 1 and the poorest cutting performance being Class 3:

Class 1—a single long continuous chip.

Class 2—two or more moderately long continuous chips.

Class 3—short segmented or discontinuous chips.

The results of testing the cutting tip samples of Body A in the above-described test were as follows:

|  | Sample 1 | Sample 2 |
| --- | --- | --- |
| Lubrication | No | Yes |
| Class of chips | 1 | 1 |
| Tip edge condition | No visible wear | No visible wear |
| Metal build up on tip edge | None | None |

Sample 1 satisfactorily performed cutting for 65 cycles before failure, at which time the edge of the tip broke and no longer cut the workpiece.

BODY B

Body B of the invention was prepared according to the molar formula:

$$2AlB_2 + 2TiO_2 \rightarrow 2TiB_2 + Al_2O_3 + 0.5 O_2$$
(reactants) (product phases) (gas)

from a dry-mixed reactant mixture consisting of 37.8 wt. % $AlB_2$ of 9.2 μm mps and 62.2 wt. % $TiO_2$ of 1.2 μm mps. After hot pressing in the usual manner at 1300° C. and 4000 psi (281.2 kg/cm²), the resultant body was found to have the phases of $TiB_2(M)$ and $9 Al_2O_3.2B_2O_3(M)$. Apparently the latter phase formed instead of oxygen gas evolution. The grain size of the $TiB_2$ phase was estimated to be generally in the range of 2-5 μm with the largest grain being 6 μm. It was intimately interdispersed with the other phase, which filled the interstices between the $TiB_2$ grains. Presumably, the $9Al_2O_3.2B_2O_3$ phase was a viscous liquid at the hot pressing temperature. Body B had a density of 3.7 g/cc, 0% open porosity and high electrical conductivity. Bodies A and B are of a type of material that is wetted by molten aluminum, but tends to be corroded by molten cryolite and similar salts.

Two samples of Body B were formed into cutting tips in the same manner as Body A samples and subjected to the earlier described metal cutting test. The results were:

|  | Sample 1 | Sample 2 |
| --- | --- | --- |
| Lubrication | No | Yes |
| Class of chips | 1 | 1 |
| Tip edge condition | No visible wear | No visible wear |
| Metal build up on tip edge | Slight | None |

BODY C

Body C of the invention was prepared without hot pressing in accordance with the molar formula:

$$2AlB_2 + 2TiO_2 + xAl_2O_3 \rightarrow 2TiB_2 + (1+x) Al_2O_3 + 0.5 O_2$$
(reactants) (diluent) (product phases) (gas)

from a dry-mixed reaction mixture consisting of 7.6 wt. % $AlB_2$ of 9.2 μm mps, 12.4 wt. % $TiO_2$ of 1.2 μm mps and 80 wt. % $Al_2O_3$ of <5 μm. That mixture was isostatically pressed at about 5000 psi (351.5 kg/cm²) into green discs which were then fired in argon at 1500° C. for 6 hours. The resulting body had the phases of $TiB_2(M)$, $Al_2O_3(M)$ and $9Al_2O_3.2B_2O_3(M)$. Body C also had ≦5 μm boride and oxide grain sizes, 3.3 g/cc density, 12.8% open porosity and 8% linear firing shrinkage.

BODY D

Another reaction hot pressed body of the invention was made from a dry-mixed −325 mesh reactant mixture prepared in accordance with the molar formula:

$$3TiO_2 + 3B_2O_3 + 10Al \rightarrow 5Al_2O_3 + 3 TiB_2.$$

That mixture was hot pressed at 1400° C. and 5000 psi (351.5 kg/cm²) for 2 hours. About 95 volume percent of the grains of both oxide and boride phases were less than or equal to 7 μm while the largest grain was 10 μm. The resultant oxide-boride body had a density of 3.8 g/cc and 2.6% open porosity.

Other reaction sintered ceramic bodies (with or without hot pressing as desired) can be formed by appropriately selecting other reactant mixtures within the invention definition. The following molar formulas are illustrative of such other selections:

$3 TiO_2 + 4 Al - 6 B \rightarrow 3TiB_2 + 2 Al_2O_3$ $2 Al + B_2O_3 + TiH_2 \rightarrow Al_2O_3 + TiB_2 + H_2$ $TiAl_2 + B_2O_3 \rightarrow TiB_2 + Al_2O_3$ $2 ZrO_2 + 2 AlB_2 \rightarrow 2 ZrB_2 + Al_2O_3 + 0.5 O_2$ $HfO_2 + 2NiB \rightarrow HfB_2 + 2 NiO$ $SiB_4 + Cr_2O_3 \rightarrow 2 CrB_2 + SiO_2 + 0.5 O_2$ $La_2O_3 + 3 NiB + 9B \rightarrow 2 LaB_6 + 3 NiO$ $TiO_2 + Zr + 2B \rightarrow ZrO_2 + TiB_2$ $CrO_3 + CeB_2 \rightarrow CeO_2 + CrB_2 + 0.5 O_2$ $ZrO_2 + MoB_2 \rightarrow ZrB_2 + MoO_2$ $HfO_2 + Pb + 2B \rightarrow HfB_2 + PbO_2$ $Nb_2O_5 + 2AlB_2 + Al \rightarrow 2NbB_2 + 1.5 Al_2O_3 + 0.25 O_2$ $ThO_2 + VB_2 \rightarrow VO_2 + ThB_2$ $Cr_2O_3 + 2AlB_2 \rightarrow 2CrB_2 + Al_2O_3$ Other reactions within the invention may also form complex oxide phases and/or complex boride phases, e.g. solid solutions.

I claim:

1. A reaction sintered oxide-boride ceramic body consisting essentially of a fine-grained, homogeneous, intimate interdispersion of:
   (a) 10-90 mole percent of boride phase or phases having a maximum grain size substantially not greater than 15 μm and being boride of one or more of the elements of Groups 3b including lanthanide and actinide series elements, 4b, 5b and 6b, and
   (b) 10-90 mole percent of oxide phase or phases having a maximum grain size substantially not greater than 15 μm and being oxide of one or more of the elements of Groups 3a, 4a, 3b, 4b, 5b, 6b and 8;
   which body is prepared by the process comprising;
   (c) admixing particulate reactants of maximum particle size substantially not greater than 150 μm and being elements, compounds, intermetallic compounds, alloys or combination thereof in stoichiometric proportions to substantially form the boride and oxide phases, and
   (d) shaping and heating the admixture to form the reaction sintered body, the heating being done in nonreactive atmosphere and at temperature at which the reaction and sintering occurs between the reactants to substantially form the boride and oxide phases.

2. The body of claim 1 which is prepared by the shaping and heating being separate sequential steps.

3. The body of claim 1 which is prepared by the shaping and heating being substantially simultaneous steps of hot pressing.

4. The body of claim 1 wherein the maximum grain size of the boride and oxide phases is substantially not greater than 5 $\mu$m and the maximum particle size of the reactants is substantially not greater than 44 $\mu$m.

5. The body of claim 4 wherein the mean grain size of the boride and oxide phases is substantially not greater than 3.5 $\mu$m.

6. The body of claim 1 wherein the boride is of one or more elements of Groups 4b, 5b and 6b, and the oxide is predominantly $Al_2O_3$.

7. The body of claim 6 wherein the boride is of one or more elements of Group 4b.

8. The body of claim 1 having 25-90 mole percent of the boride phase or phases and 10-75 mole percent of the oxice phase or phases.

9. The body of claim 8 which is prepared by the shaping and heating being substantially simultaneous steps of hot pressing.

10. The body of claim 9 wherein the maximum grain size of the boride and oxide phases is substantially not greater than 5 $\mu$m and the maximum particle size of the reactants is substantially not greater than 44 $\mu$m.

11. The body of claim 10 wherein the boride is of one or more elements of Groups 4b, 5b and 6b, and the oxide is predominantly $Al_2O_3$.

12. The body of claim 11 wherein the main grain size of the boride and oxide phases is substantially not greater than 3.5 $\mu$m.

13. The body of claim 12 wherein the boride is of one or more elements of Group 4b.

14. The body of claim 13 wherein the maximum grain size of the boride and oxide phases is less than 2 $\mu$m.

15. The body of claim 14 wherein the boride is $TiB_2$ and the oxide is $Al_2O_3$.

16. The method of forming the body of claim 1 comprising:
   (a) admixing the particulate reactants, and
   (b) shaping and heating the admixture to form the reaction sintered body.

17. A reaction sintered oxide-boride ceramic body having a virtual absence of open porosity and consisting essentially of a fine-grained, homogeneous, intimate interdispersion of:
   (a) 10-90 mole percent of boride phase or phases having a maximum grain size substantially not greater than 15 $\mu$m and being boride of one or more of the elements of Groups 3b including lanthanide and actinide series elements, 4b, 5b and 6b, and
   (b) 10-90 mole percent of oxide phase or phases having a maximum grain size substantially not greater than 15 $\mu$m and being oxide of one or more of the elements of Groups 3a, 4a, 3b, 4b, 5b, 6b and 8;
   which body is prepared by the process comprising;
   (c) admixing particulate reactants of maximum particle size substantially not greater than 150 $\mu$m and being elements, compounds, intermetallic compounds, alloys or combination thereof in stoichiometric proportions to substantially form the boride and oxide phases, and
   (d) shaping and heating the admixture to form the reaction sintered body, the heating being done in nonreactive atmosphere and at temperature at which the reaction and sintering occurs between the reactants to substantially form the boride and oxide phases.

18. A reaction sintered oxide-boride ceramic body having not greater than 5% open porosity and consisting essentially of a fine-grained, homogeneous, intimate interdispersion of:
   (a) 10-90 mole percent of boride phase or phases having a maximum grain size substantially not greater than 15 $\mu$m and being boride of one or more of the elements of Groups 3b including lanthanide and actinide series elements, 4b, 5b and 6b, and
   (b) 10-90 mole percent of oxide phase or phases having a maximum grain size substantially not greater than 15 $\mu$m and being oxide of one or more of the elements of Groups 3a, 4a, 3b, 4b, 5b, 6b and 8;
   which body is prepared by the process comprising;
   (c) admixing particulate reactants of maximum particle size substantially not greater than 150 $\mu$m and being elements, compounds, intermetallic compounds, alloys or combination thereof in stoichiometric proportions to substantially form the boride and oxide phases, and
   (d) shaping and heating the admixture to form the reaction sintered body, the heating being done in nonreactive atmosphere and at temperature at which the reaction and sintering occurs between the reactants to substantially form the boride and oxide phases.

19. A reaction sintered oxide-boride ceramic body having less than about 3% open porosity and consisting essentially of a fine-grained, homogeneous, intimate interdispersion of:
   (a) 10-90 mole percent of boride phase or phases having a maximum grain size substantially not greater than 15 $\mu$m and being boride of one or more of the elements of Groups 3b including lanthanide and actinide series elements, 4b, 5b and 6b, and
   (b) 10-90 mole percent of oxide phase or phases having a maximum grain size substantially not greater than 15 $\mu$m and being oxide of one or more of the elements of Groups 3a, 4a, 3b, 4b, 5b, 6b and 8;
   which body is prepared by the process comprising;
   (c) admixing particulate reactants of maximum particle size substantially not greater than 150 $\mu$m and being elements, compounds, intermetallic compounds, alloys or combination thereof in stoichiometric proportions to substantially form the boride and oxide phases, and
   (d) shaping and heating the admixture to form the reaction sintered body, the heating being done in nonreactive atmosphere and at temperature at which the reaction and sintering occurs between the reactants to substantially form the boride and oxide phases.

20. The body of claim 17 further having Rockwell A hardness of greater than 90.

21. The body of claim 18 further having Rockwell A hardness of greater than 90.

22. The body of claim 19 further having Rockwell A hardness of greater than 90.

23. A cutting tool tip formed of the body of claim 1.

24. A cutting tool tip formed of the body of claim 17.

* * * * *